Sept. 22, 1959 M. M. HURST 2,904,894
AUTOMOBILE DRYING INSTALLATION
Filed May 10, 1956 2 Sheets-Sheet 2
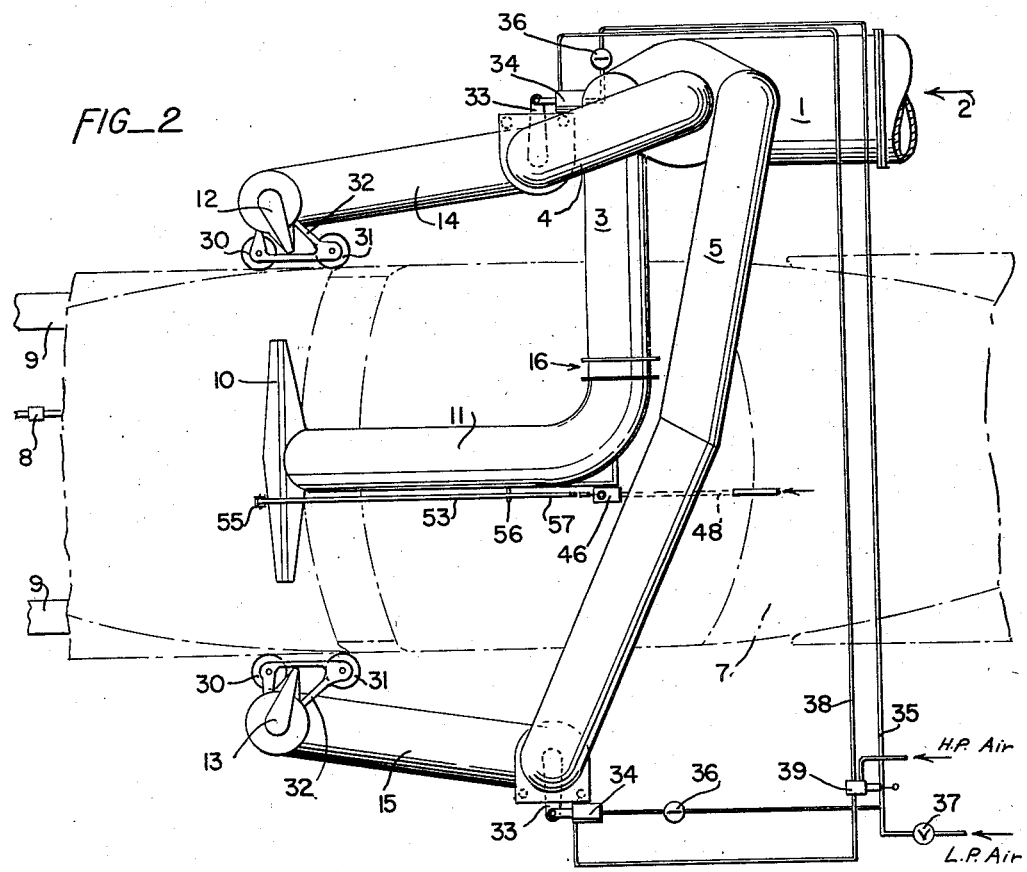
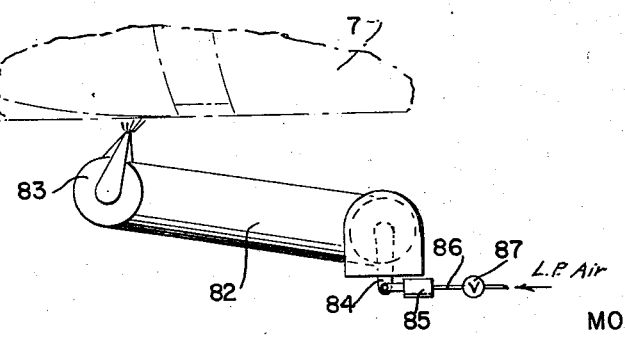
INVENTOR.
MOWATT M. HURST
BY
Boyken, Mohler & Wood
ATTORNEYS United States Patent Office 2,904,894
Patented Sept. 22, 1959

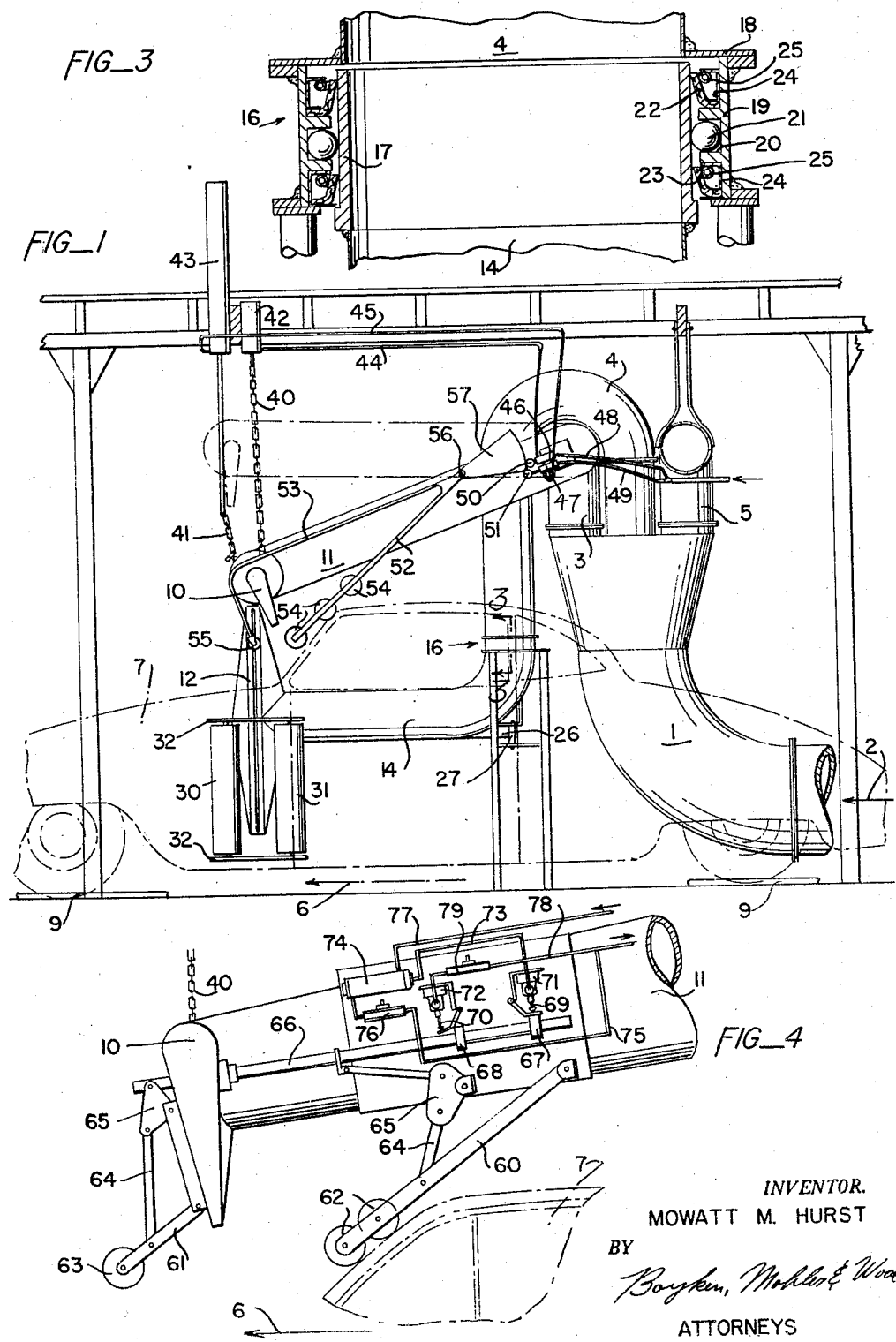

2,904,894
AUTOMOBILE DRYING INSTALLATION
Mowatt M. Hurst, San Carlos, Calif.
Application May 10, 1956, Serial No. 583,994
3 Claims. (Cl. 34—43)

This invention relates to automobile drying installations and more particularly to novel means for mounting and controlling air discharge nozzles for drying the outer surfaces of an automobile.

In prior art installations air discharge nozzles have been mounted alongside and above a path along which an automobile is adapted to be moved in order to dry the surfaces of the automobile. It has been found that to do an adequate job of drying in a short time in this manner the nozzles must be positioned relatively close to the surface to be dried.

In order to so position the nozzles with respect to the varying contour of an automobile hood, top, and trunk deck, some prior devices have mounted rollers rigid with the nozzle to guide it over the upper surface of the vehicle. One major fault of such an installation results from the rollers picking up water and leaving unsightly streaks on the surfaces of the vehicle. Also, in such cases the rollers are required to support the rather large weight of the nozzle and appended duct work and therefore may damage aerials, ornaments, and the like on the automobile.

It is therefore an object of this invention to provide means for drying a vehicle that overcome the disadvantages of the prior art.

Another object of this invention is the provision of improved means for guiding an air discharge nozzle over the surfaces of an automobile to be dried by the air blast from such nozzle.

Still another object of this invention is the provision of means in an automobile drying installation for detecting the contour of the automobile during drying.

It is yet another object of this invention to provide an automobile drying installation in which the air discharge nozzles are supported relatively near the surfaces to be dried and yet quickly and accurately respond to changes in the shape of such surfaces.

Other objects and advantages will become apparent from the following description taken in connection with the accompanying drawings, in which:

Fig. 1 is a partial side elevational view and partial vertical sectional view of the automobile drying installation of this invention;

Fig. 2 is a top plan view of the installation of Fig. 1;

Fig. 3 is a greatly enlarged sectional view taken generally along line 3—3 of Fig. 1, and showing the details of the rotating duct connection;

Fig. 4 is an enlarged elevational view, similar to Fig. 1, of a portion of the top nozzle of a modified form of drying installation; and, Fig. 5 is a top plan view, similar to Fig. 2, of a modified form of side nozzle.

In detail, referring to Figs. 1 and 2, the installation of this invention comprises a main air duct 1 for conducting air under presure in the direction of arrow 2 from an air source (not shown) to the plurality of branch ducts 3, 4, 5. Duct 3 leads to a point above and ducts 4, 5 to points on opposite sides of a vehicle path of travel designated by the arrow 6 in Fig. 1. As in a conventional installation, a vehicle 7 is adapted to be moved along this horizontal path of travel by a tow chain 8 (Fig. 2) or the like and with the wheels of said vehicle confined in the customary tracks 9.

An air discharge nozzle 10 is mounted at the end of a vertically movable duct 11 for discharging air on the upwardly directed surfaces of automobile 7. The end of duct 11 remote from nozzle 10 is provided with an elbow rotatably secured to duct 3 so that duct 11 will be swingable in a vertical plane thereby mounting nozzle 10 for movement toward and away from said upward surfaces of said vehicle. Likewise a pair of side nozzles 12, 13 are mounted at the ends of ducts 14, 15 which are provided with elbows at their opposite ends rotatably secured to ducts 4, 5, respectively. By this structure nozzles 12, 13 are adapted to discharge air against the sides of vehicles 7 and are mounted for movement toward and away from said vehicle.

A cross section of a representative coupling between ducts 14 and 4, 15 and 5, and 11 and 3, is shown in Fig. 3 and generally designated 16. Coupling 16 is shown in Fig. 3 as connecting ducts 14 and 4 and comprises a sleeve extension 17 secured to the end of duct 14 in axial extension thereof. A flange 18 on duct 4 carries a sleeve housing 19 axially secured thereto, which housing is provided with an annular race 20 which receives a plurality of ball bearings 21. Balls 21 provide the bearing surface in which the extension 17 is journalled for rotation and on either side of said ball bearings are a pair of flexible sealing lips 22, 23. Annular lips 22, 23 may have a generally L-shaped cross section with one leg thereof secured to housing 19 by means of clips 24. The remainder of sealing lips 22, 23 extend angularly into engagement with the outer periphery of sleeve 17 and may be held in said engagement by flexible rings such as coil springs 25. The combination of lips 22, 23 and ball bearings 21 thereby provides both a bearing surface for rotatably mounting the nozzle ducts with respect to the fixed branch ducts and also forms an air seal between the two.

Especially in the case of ducts 14, 15 it may be desirable to provide an outboard arm 26 (Fig. 1) rotatably mounted in a fixed bearing 27. Arm 26 and bearing 27 may act both as an axial stabilizer and as a thrust bearing.

In the case of both top nozzle 10 and side nozzles 12, 13 it is desirable that the nozzles should be positioned a predetermined distance away from the surface of the vehicle in order to provide the maximum drying effect from the air blast discharged by said nozzles. In the case of side nozzles 12, 13 this may be done relatively easily by mounting a pair of large, soft rubber rollers 30, 31 on opposite sides of each of said nozzles 12, 13. Rollers 30, 31 are journalled between brackets 32 affixed to each of said nozzles 12, 13 with the axis of said rollers generally vertical and parallel to the elongated side nozzles.

An arm 33 (Fig. 2) is secured to the end of each movable side duct 14, 15 at the end thereof adjacent coupling 16. Arms 33 are in effect cranks for urging ducts 14, 15 and thereby nozzles 12, 13 toward the vehicle 7 by means of low pressure air cylinders 34, which have their piston rods connected to arms 33. An air input line 35 leads from a low pressure air source (now shown) through pressure regulators 36 to one end of cylinders 34 to cause said cylinders to urge ducts 14, 15 oppositely inwardly toward vehicle 7. A valve 37 may be placed in input line 35 for the purpose of regulating the low pressure air.

As vehicle 7 approaches side nozzles 12, 13 it will first contact rollers 31 thereby pushing said side nozzles outwardly against the urgency of cylinders 34 and will hold the nozzles in the correct position relative to the sides of the vehicle. When the vehicle has traveled past nozzles 12, 13 rollers 30 will hold said nozzles out of contact with the vehicle surfaces.

In some cases a relatively wide vehicle or one that has been deformed will be towed through the drying installation. In this event it may be desired to swing nozzles 12, 13 completely out of the way. For this purpose a high pressure air line 38 connects to the opposite end of the cylinders 34 from line 35. High pressure line 38 is connected through manually operated valve 39 to a high pressure air source (not shown). Actuating valve 39 to conduct the high pressure air to cylinders 34 overcomes the pressure in line 35 thereby swinging the nozzles 12, 13 oppositely outwardly away from the vehicle path.

The mechanism for positioning overhead nozzle 10 a predetermined distance from the upper surface of the vehicle to be dried is somewhat more complicated for the following reasons. In the first place nozzle 10 must move through a greater range of distances in order to follow the changing contour of the upper surfaces of vehicle 7. An attempt to support nozzle 10 in the manner described for side nozzles 12, 13 is impractical because of the relatively large weight of nozzle 10 and duct 11 which must be supported. Hence, it has been found desirable to support nozzle 10 for movement toward and away from the upper surfaces of a vehicle 7 by some raising and lowering means.

In the form shown in Fig. 1 nozzle 10 is supported by means of a pair of chains 40, 41 depending from the end of piston rods of a pair of vertical air cylinders 42, 43. Cylinder 42 is a short stroke cylinder whereas cylinder 43 is a long stroke cylinder, for a purpose to be described. Said cylinders are single acting cylinders and are connected by means of lines 44, 45, to separate three-way valves 46, 47. Valves 46, 47 are each connected to a source of compressed air (not shown) by means of lines 48, 49 for conducting air therefrom to cylinders 42, 43 when the plungers 50, 51 of said valves are actuated. Plungers 50, 51 are spring urged outwardly and valves 46, 47 open to atmospheric exhaust in this position.

Pivotally mounted on duct 11 are a pair of integrally connected feeler or detector arms 52, 53. Said arms extend to positions spaced downwardly from the open discharge end of nozzle 10 and on opposite sides thereof in the direction of movement of vehicle 7. At their lower ends arms 52, 53 are provided with small rubber contact wheels 54, 55 for contacting the upwardly directed surfaces of vehicle 7.

On the opposite sides of pivot 56, which swingably mounts arms 52, 53 to duct 11, is a valve actuating cam 57 which is integral with said arms and swings therewith. Arms 52, 53 and nozzle 10 are originally set so that wheel 54 will first contact the hood of a vehicle 7 as it approaches. As the vehicle progresses through the drying installation and the contour of the hood rises, arm 52 detects the rise and swings upwardly in response thereto. This movement causes cam 57 to swing downwardly into engagement with plunger 50 of valve 46 thereby conducting air to cylinder 42 to raise nozzle 10. If the rise in the contour in the upper surface of vehicle 7 should be relatively rapid, as for instance in the location between the hood and the top of the vehicle, arm 52 will swing cam 57 sufficiently to contact plunger 51 on valve 47 thereby bringing long stroke cylinder 43 into operation to more rapidly raise nozzle 10.

As the upper surface contour of the vehicle drops off toward the rear thereof, arm 53 will take over the control from arm 52 and as wheel 55 drops down the rear vehicle contour, cam 57 will swing upwardly out of engagement with plungers 50, 51 thereby exhausting cylinders 42, 43 through valves 46, 47. In this manner nozzle 10 will drop of its own weight thereby maintaining the correct distance from the upper surface of the vehicle.

By this structure thus shown and described only the very light weight of wheels 54 and 55 and arms 52, 53 are supported on the vehicle 7. The movement of said arms in response to the changing contour of the upper vehicle surface is immediately transmitted to the raising and lowering cylinders 42, 43 thereby maintaining the nozzle 10 at the most efficient distance from the surface to be dried. In addition, wheels 54, 55 may be made relatively small so as to not interfere with ornaments and the like on the vehicle or cause unsightly streaks or marks in traveling over the upper surface of said vehicle.

In the modification shown in Fig. 4, a somewhat different control mechanism is illustrated for use with the upper nozzle 10 mounted at the end of swingably supported duct 11. In this case an inner cylinder may also be used to lift and lower nozzle 10 through a chain 40. As shown in Fig. 4 detector arms 60, 61 are pivotally mounted to the nozzle and duct structure on opposite sides of nozzle 10 and extending slightly downwardly therefrom. The lower ends of said arms are provided with contact wheels 62, 63. Arms 60, 61 are connected through linkages 64 and cranks 65 to a control rod 66 which is mounted for reciprocation generally longitudinally of duct 11. Raising and lowering of wheels 62, 63 in response to the contour of the upper surface of vehicle 7 causes swinging of arms 60, 61 and thereby reciprocation of control rod 66.

Said control rod is provided with a pair of fixed collars 67, 68 which upon movement of rod 66 are adapted to alternately contact the plungers 69, 70 of the pair of poppet valves 71, 72 for opening the same. Valve 71 is connected by line 73 to one end of a spool valve 74 which becomes unbalanced upon exhausting through poppet valve 71. The other end of spool valve 74 is connected by line 75 through a needle valve 76 to an air cylinder, a piston rod of which is connected to chain 40 for raising nozzle 10.

Air is supplied from a source of compressed air (not shown) through line 77 to spool valve 74. The return or exhaust from the raising and lowering cylinder is connected by line 78 through needle valve 79 to poppet valve 72.

In the position shown in Fig. 4 the rising contour of the upper surface of the vehicle 7 has swung detector arm 60 upwardly so as to urge control rod rearwardly to open poppet valve 71. This causes spool valve 74 to become unbalanced and the high pressure air from line 77 to be directed through said spool valve, needle valve 76 and through line 75 to the air cylinder connected to chain 40 thereby raising nozzle 10.

As the vehicle moves past nozzle 10 and wheel 63 drops down on the rear deck thereof, arm 61 falls of its own weight thereby pulling control rod 66 forwardly. In this event collar 68 opens poppet valve 72 thereby exhausting the nozzle raising cylinder through line 78, needle valve 79 and poppet valve 72. At the same time poppet valve 71 is closed, since it is spring loaded, when collar 67 is withdrawn therefrom thereby rebalancing spool valve 74. Needle valves 76, 79 are for the purpose of controlling the speed of the air to and from the raising and lowering cylinder.

The result similar to that described with reference to Fig. 1, is achieved by the modification of Fig. 4 in that the only portions of the mechanism controlling the position of nozzle 10 which are supported by the vehicle 7 are the relatively small and light detector arms 60, 61 and wheels 62, 63. By correct adjustment of collars 67, 68 and needle valves 76, 79 the mechanism of Fig. 4 is adapted to immediately respond to the changing contour of the upper surfaces of the vehicle 7 to correctly position nozzle 10 a predetermined distance therefrom.

A modification of the side nozzle structure is shown in Fig. 5 in which a duct 82 having an air discharge nozzle 83 at one end thereof mounted for swinging in a horizontal plane toward and away from vehicle 7 about the other end of said duct. Said other end of said duct is provided with an eccentric arm 84 connected to the piston rod of the low pressure air cylinder 85. Cylinder 85 is provided with air from a low pressure source (not shown) through line 86 and valve 87. The action of cylinder 85 is to urge nozzle 83 inwardly toward the side surface of the vehicle 7 against which said nozzle discharges air for drying the same.

It will be noted that in so discharging air against the vehicle surface, a reaction effect is created tending to push nozzle 83 outwardy away from vehicle 7. By correctly setting valve 87 this reaction effect can be balanced by the force applied by cylinder 85 so that nozzle 83 will remain spaced a predetermined distance from the surface being dried.

It has been found that as a surface to be dried approached a nozzle 83 issuing air, there is an increased reaction effect between the nozzle and the surface tending to urge the nozzle away from the surface. This increased effect when balanced by the force of cylinder 85 automatically positions the nozzle the correct distance from the surface for the most efficient drying. It will also be obvious that exhausting cylinder 85 so that the same applies no force to arm 84 will result in duct 82 and nozzle 83 swinging outwardly from vehicle 7 in a manner similar to that resulting from the high pressure system of Fig. 2.

Although the invention has been described and illustrated in detail, such is not to be taken as restrictive thereof, since it is obvious that modification could be made therein without departing from the spirit and scope of the invention.

I claim:

1. In an automobile drying installation having a path of travel along which automobiles are adapted to move, an air discharge nozzle, means supporting said nozzle over said path for discharging air in a generally downwardly direction against the upwardly directed surfaces of an automobile in said path and for movement toward and away from said surfaces, detector means for detecting and signalling the elevational contour of said surfaces, and pneumatic means connected to said nozzle for raising and lowering said nozzle in response to the signal of said detector means, said detector means including valve means connected to said pneumatic means and operative to control movement of the latter.

2. In an automobile drying installation having a path of travel along which automobiles are adapted to move, an air discharge nozzle, means supporting said nozzle over said path for discharging air in a generally downwardly direction against the upwardly directed surfaces of an automobile in said path and mounting said nozzle for generally vertical up and down movement, said supporting means including reversible motor means connected to said nozzle for so moving said nozzle, detector means for detecting the relative up and down movement of the upwardly directed surfaces of an automobile moving along said path, and control means directly connecting said detector means to said motor means operable to reverse said motor means in direct response to both the up and down movement detected by said detector means, whereby said nozzle will be spaced a predetermined distance above said surfaces of an automobile in said path.

3. In an automobile drying installation having a path of travel along which automobiles are adapted to move, an air discharge nozzle, means supporting said nozzle over said path for discharging air in a generally downwardly direction against the upwardly directed surfaces of an automobile in said path and mounting said nozzle for generally vertical up and down movement, said supporting means including reversible motor means connected to said nozzle for so moving said nozzle, detector means for detecting the relative up and down movement of the upwardly directed surfaces of an automobile moving along said path, and control means directly connecting said detector means to said motor means operable to reverse said motor means in direct response to both the up and down movement detected by said detector means, whereby said nozzle will be spaced a predetermined distance above said surfaces fo an automobile in said path, said detector means including a pair of feelers mounted on opposite sides of said nozzle adapted to engage said surfaces of an automobile moving along said path ahead of and behind said nozzle and movable upwardly and downwardly for operating said control means.

References Cited in the file of this patent

UNITED STATES PATENTS

| | | |
|---|---|---|
| 1,697,879 | Olson | Jan. 8, 1929 |
| 2,132,303 | Lathrop | Oct. 4, 1938 |
| 2,321,983 | Brackett | June 15, 1943 |
| 2,440,157 | Rousseau | Apr. 20, 1948 |
| 2,711,592 | Larson | June 28, 1955 |
| 2,777,419 | Paasche | Jan. 15, 1957 |
| 2,787,062 | Zademach | Apr. 2, 1957 |